Oct. 2, 1934.   D. T. HASTINGS ET AL   1,975,208
VEHICLE CONSTRUCTION
Filed Feb. 5, 1931   6 Sheets-Sheet 1

INVENTORS.
Don T. Hastings
George F. Knowles.
BY Whittemore Hulbert
Whittemore & Belknap
ATTORNEYS.

Oct. 2, 1934.  D. T. HASTINGS ET AL  1,975,208
VEHICLE CONSTRUCTION
Filed Feb. 5, 1931   6 Sheets-Sheet 3

INVENTORS.
Don T. Hastings
George F. Knowles.
BY Whittemore Hulbert
Whittemore & Belknap
ATTORNEYS Patented Oct. 2, 1934

1,975,208

UNITED STATES PATENT OFFICE

1,975,208

VEHICLE CONSTRUCTION

Don T. Hastings, Detroit, Mich., and George F. Knowles, Toronto, Ontario, Canada, assignors to Twin-Flex Corporation, Detroit, Mich., a corporation of Michigan Application February 5, 1931, Serial No. 513,745

7 Claims. (Cl. 180—22)

This invention relates generally to motor vehicles of the type having spaced driving and idler axle assemblies equipped with tandemly arranged road engaging wheels and connected to the vehicle in such a manner as to cooperate with each other in carrying the vehicle load.

The invention concerns itself more particularly with the provision of means for increasing the traction of vehicles of the above type by driving the idler wheels as well as the drive wheels with the result that the former, in addition to performing their usual function previously stated, also assist in driving the vehicle.

The four-wheel drive principle is not broadly new in the art and the reduction to practice of several four-wheel drive systems has proved conclusively that these systems possess many serious objections, several of which will be briefly discussed herein. One system which appeared to be the natural development is to employ two differential drive axles operatively connected to each other and actuated by a single propeller shaft extending from the motor. This latter system is probably the most inefficient and impractical arrangement contemplated and is generally considered unsatisfactory for commercial use.

Perhaps one of the most outstanding objections to the dual differential drive principle is the inability of the latter to compensate for the tendency of one of the tandem wheels to rotate relative to the adjacent wheel. This tendency is commonly known in the art as "tire fight" and is due principally to irregularities in the road which cause one of the tandem wheels to travel a greater or less distance than the other and is greatly aggravated if the tires for the wheels in question differ in rolling diameter due either by inaccuracies in manufacture, irregular wear of the tire treads or differences in inflation pressures. Inasmuch as the four wheels are connected to the axles in such a way that they are compelled to turn at the same rate of speed, it necessarily follows that one tire must slip forward and the other backward slightly when the vehicle is propelled over irregular roads. This condition not only results in considerable wear of the tires, especially when the latter are operating over hard, dry roads particularly if they are irregular, but also results in undue wear of the differential gears and in addition appreciably reduces the delivered power of the motor.

A later development of the four-wheel drive principle is to incorporate in a unit of the type hereinbefore set forth what is commonly known in the art as a third locking differential. This latter arrangement, while considerably more satisfactory than the system previously described, is, nevertheless, objectionable due to the fact that the cost of equipping a vehicle with three differential units is prohibitive. Moreover, the provision of three differential units materially increases the unsprung weight of the vehicle.

Aside from the foregoing objections, it is to be noted that both systems have the further objection in that the four-wheel drive is a permanent feature. A permanent four-wheel drive is undesirable for the reason that under normal operating conditions, the increased traction afforded by the four-wheel drive principle is not essential and accordingly is of no value to a user continuously operating the vehicle in localities having good hard roads.

The present invention consists essentially in the provision of an improved four-wheel drive system designed to eliminate the objectionable features hereinbefore referred to and has as one of its objects to provide four-wheel drive mechanism in the form of an attachment capable of being readily applied to or removed from the vehicle in accordance with operating conditions.

Another object of this invention resides in the provision of four-wheel drive mechanism which, when applied to a vehicle, does not appreciably add to the unsprung weight thereof and which, when not in use, may be stored in a relatively compact space in the vehicle permitting the operator to readily convert the latter from a two to a four-wheel drive when operating conditions become abnormal.

More specifically, the present invention contemplates driving the idler wheels from the driving axle by chains having a certain amount of flexibility or backlash permitting a corresponding degree of relative rotation of adjacent wheels. Thus, it will be apparent that the flexibility of the chains compensates to a great extent for the objectionable "tire fight" discussed above.

Another advantageous feature of this invention resides in the provision of a four-wheel drive construction of the type specified above wherein the chain operates over sprockets removably attached to the outer sides of the driving and trailer wheels.

A further object of the present invention is to provide radius rods interconnecting the driving and idler axles for maintaining the same fixed distances apart and thereby insure efficient operation of the chains. In addition to the above, the invention contemplates utilizing one of the rods for taking the torque reaction of the brakes on the idler wheels.

A further object of this invention is to provide adjustable means for the radius rods, whereby the effective length of the same may be varied to effect a corresponding variation in the center distances of the axles and thereby compensate for wear of the chain.

Another object of the present invention resides in the novel manner in which the opposite ends of the rear springs are operatively connected to the driving and idler axles.

A further advantageous feature of the invention resides in the provision of means for demountably securing the sprockets to the vehicle wheel bodies by the fastening means for the latter forming a part of the standard equipment of the wheels.

A still further feature of the present invention resides in the provision of a sprocket construction designed to be interchanged with the outer wheel of a dual wheel combination or to be mounted intermediate the wheel bodies of dual wheels.

The foregoing as well as other objects will be made more apparent as this description proceeds, especially when considered in connection with the accompanying drawings, wherein:

Figures 12 and 13 are views similar to Figures 2 and 3 showing a slightly modified form of construction.

Figure 1:
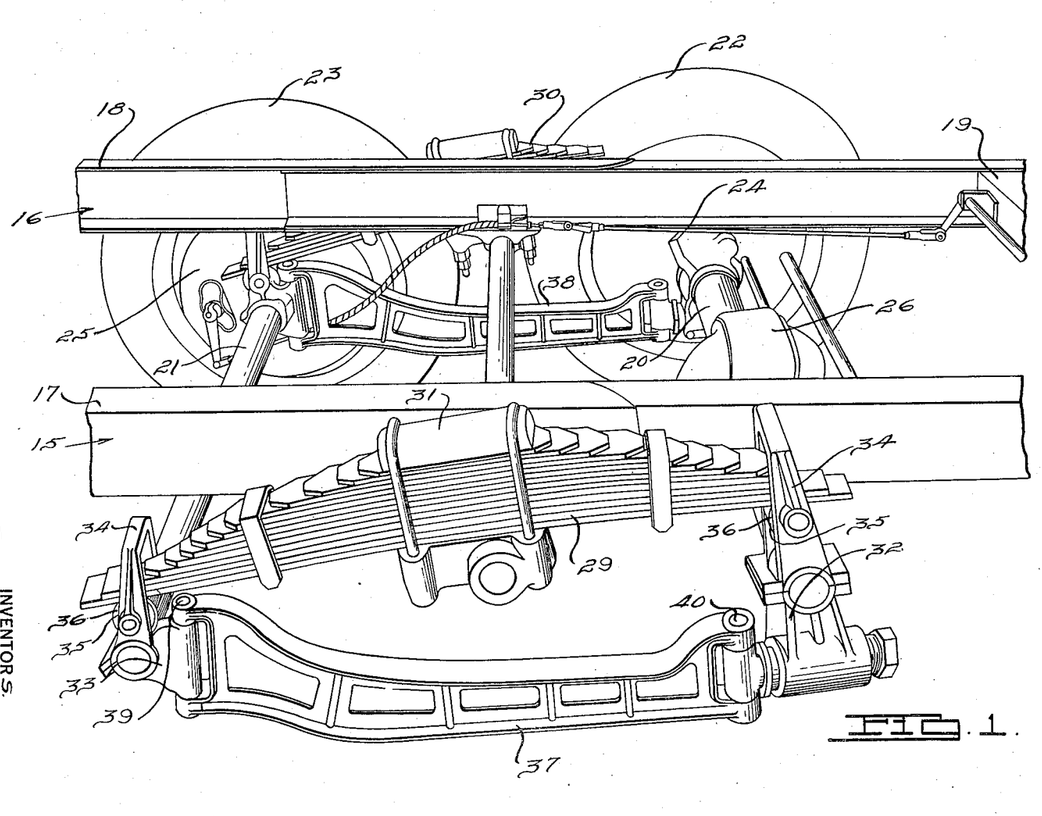
Figure 1 is a fragmentary perspective view of a vehicle constructed in accordance with this invention.
Figures 2, 3:
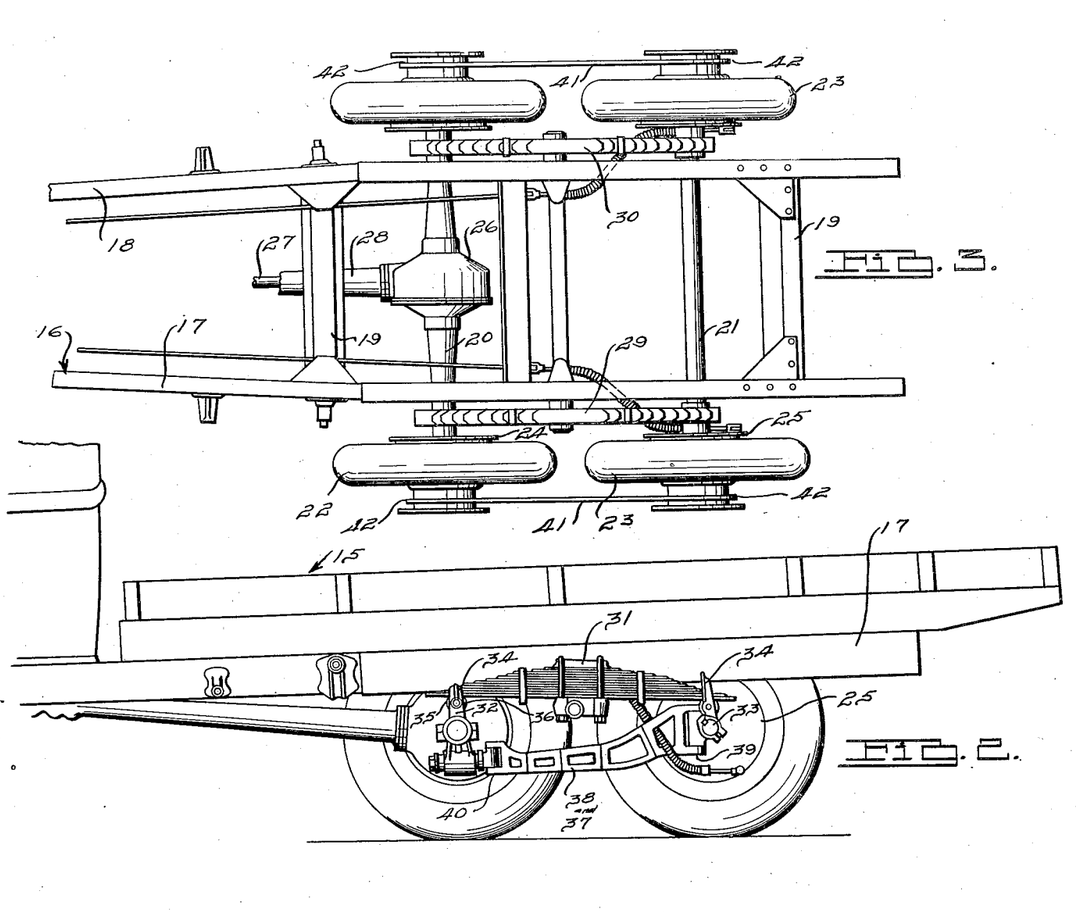
Figure 2 is a longitudinal sectional view through the construction shown in Figure 1.
Figure 3 is a plan view of the construction shown in Figure 1.

Referring now to the drawings, it will be noted that there is illustrated in Figures 1 to 3, inclusive, a portion of a vehicle chassis 15 having a frame 16 comprising laterally spaced sill members 17 and 18 rigidly secured in proper spaced relation by means of a series of crossbraces 19 extending transversely of the frame. Suspended from the frame 16 in a manner to be presently described, is a pair of axles 20 and 21 positioned adjacent the rear end portions of the chassis frame and spaced from each other longitudinally of the latter. Mounted upon each of the axles 20 and 21 is a set of road engaging wheels 22 and 23, respectively, preferably arranged in tandem. The wheels aforesaid may be either of the single or dual type, depending upon operating conditions and are each equipped with suitable brake assemblies designated generally herein by the reference characters 24 and 25, respectively.

The axle 20 is preferably a live axle driven by a suitable differential unit 26 which in turn is operatively connected to the motor (not shown) through the intermediary of a conventional propeller shaft 27 extending through the tube 28. In the illustrative embodiment of the invention shown in Figures 1 to 3, inclusive, the rear end of the tube 28 is rigidly secured to the differential housing casing, while the forward end thereof is rigidly secured to the power unit. The arrangement is such that the tube 28 serves the dual function of transmitting the propelling force of the driving wheels 22 to the vehicle and taking up the torque reaction of the axle 20. The axle 21 and associated wheels 23 are located in rear of the axle assembly 20 and will be hereinafter referred to as the idler or trailer axle assembly.

One of the features of the present invention resides in the novel means for suspending the axle assemblies 20 and 21 from the frame 16 and accordingly, this construction will now be described in detail. For accomplishing the above result, we provide a pair of leaf springs 29 and 30 disposed respectively on opposite sides of the frame 16 and pivotally connected to the latter intermediate the axles 20 and 21. The springs 29 and 30 are pivotally connected to the frame by means of a shaft extending transversely of the frame and having the opposite ends projecting laterally beyond the sills and journaled in suitable brackets 31 fixed to the springs intermediate the ends thereof. In the illustrative embodiment of the invention, the above arrangement of the springs is such that the vehicle load is divided equally between the driving axle assembly 20 and the idler axle assembly 21 irrespective of variations in the load. It is to be noted, however, that this ratio may be varied without departing from the spirit and scope of this invention. The opposite end portions of the springs have a sliding connection with the axles 20 and 21 and this sliding connection is accomplished in the present instance by providing two sets of brackets 32 and 33 respectively mounted upon the axles 20 and 21 adjacent opposite ends thereof. Each of the aforesaid brackets are provided with upwardly extending arms 34 spaced from each other a sufficient distance to receive the opposite end portions of the springs 29 and 30. Journaled in the arms 34 and disposed therebetween are suitable rollers 35 engaging the lowermost leaves of the springs 29 and 30 and having radially extending flanges 36 adapted to assume a position upon opposite sides of the end portions of the springs for guiding the latter during movement thereof relative to the brackets.

The axles 20 and 21 are connected to each other by means of a pair of torque arms 37 and 38 disposed between the aforesaid axles. The rear ends of the torque arms are pivotally connected to the brackets 33 by means of pins 39 and the forward ends of the arms are pivotally connected to the brackets 32 by means of the pins 40 which, like the pins 39, have their axes arranged transversely to the axes of the axles 20 and 21. In order to provide an efficient construction and at the same time to permit proper up and down movement of the axles relative to each other, the brackets 32 and one of the brackets 33 are mounted upon the respective axles for oscillatory movement relative to the latter. The other bracket 33 on the axle 21 is rigidly secured to the latter axle so as to prevent rotation of the same and to permit the arm 38 associated therewith to take up the torque reaction of the brakes 25 on the idler wheels 21. Thus, it will be apparent that the forward ends of the arms 37 and 38 are universally connected to the driving axle 20, thereby permitting independent up and down movement of both axles. It will further be observed from the previous description that irrespective of relative up and down movements of the axles caused by irregularities in the road, the arms 37 and 38 maintain the distance between the centers of the axles constant.

Figures 6, 7, 8:
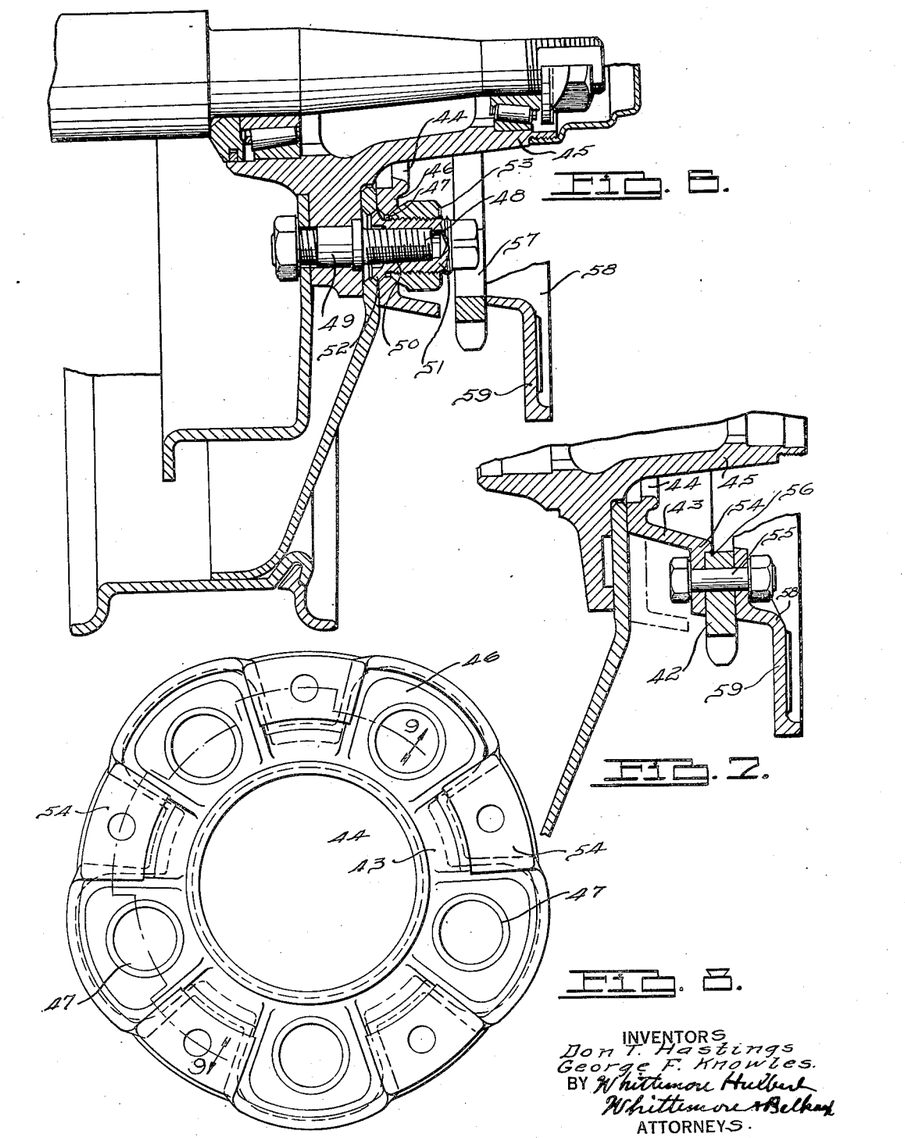
Figure 6 is a sectional view taken on the line 6—6 of Figure 5.
Figure 7 is a sectional view taken on the line 7—7 of Figure 5.
Figure 8 is a front elevational view of one of the sprocket mounting members.

By reason of this latter construction, a novel type of chain drive may be provided between the driving and idler axles, thereby rendering it possible to drive the idler wheels 23 and as a consequence, materially increase the traction of the vehicle. As previously stated, it is one of the objects of this invention to provide a chain drive mechanism for the idler wheels which is in the form of an attachment capable of being readily applied to or removed from the vehicle and thereby permitting the latter to be converted, at will, from a conventional two-wheel drive system to a four-wheel drive construction or vice versa. In detail, the present invention contemplates driving both the idler wheels 23 from the driving wheels 22 by means of a pair of chains 41 preferably of the roller type and adapted to extend over sprockets 42 secured to the outer sides of the wheels 22 and 23. The free ends of the chains are readily detachably secured together by means of a cotter pin or similar connection so as to permit the same to be readily removed when desired. The sprockets 42 are secured to the outer sides of the wheels in axial spaced relation thereto by means of spacers 43 having central openings 44 therein for receiving the wheel hubs 45. The spacers 43 are further provided with circumferentially spaced portions 46 adapted to embrace the outer sides of the wheels, as shown in Figure 6, and are apertured as at 47 to permit the wheel body securing means 48 to project therethrough. The securing means 48, illustrated in Figure 6, forms the standard equipment on a number of dual wheels now commercially produced and comprises generally bolts 49 having threaded portions 50 extending through the wheel body and openings 47 in the spacers 43 for receiving suitable clamping nuts 51. The clamping nuts 51 are also adapted to extend through the openings 47 in the spacers and are provided with flared rear end portions 52 engaging corresponding shoulders on the wheel body members for clamping the same to the radial fixed flanges on the wheel hubs 45. The nuts 51 are also provided with threaded exterior surfaces for receiving the clamping nuts 53 having as their usual function to clamp the outer wheel body members of the dual wheels to the hubs, but operate in the present instance to clamp the spacers 43 to the wheel body members of the wheels 22 and 23. Thus, it will be observed that the spacers 43 may be interchanged with the outer wheel of a dual wheel combination by merely removing the outer wheel body members and substituting therefor the spacers 43.

As shown in Figure 7, portions 54 of the spacers intermediate the portions 46 are spaced axially outwardly from the latter portions and are secured to the sprockets 42 by means of a series of bolts and nuts 55 arranged intermediate the securing means 48. The sprockets 42 are initially positioned upon the portions 54 of the spacers by means of the axially extending seats 56 projecting forwardly from the portions 54 of the spacer and engaging the adjacent inner circumferential edge portions of the sprockets. In this connection it is to be noted that the latter edge portions of the sprockets are cut away as at 57 opposite the securing means 48 so as to render the latter accessible from positions in front of the wheels.

The sprockets are provided with guards 58 secured to the outer sides thereof by the fastening means 55 and are provided with radial portions 59 extending outwardly a substantial distance beyond the periphery of the sprockets. From the previous description, it will be apparent that our improved traction increasing or four-wheel drive mechanism is in the form of an attachment capable of being readily applied to or removed from the vehicle when desired. It will further be observed that our four-wheel drive attachment is so designed as to permit the same to be either applied directly to wheels of the single wheel body type or to be interchanged with the outer wheel body of a dual wheel body combination, thereby permitting the alternate use of the dual wheel and the four-wheel drive attachment.

Figures 9, 10:
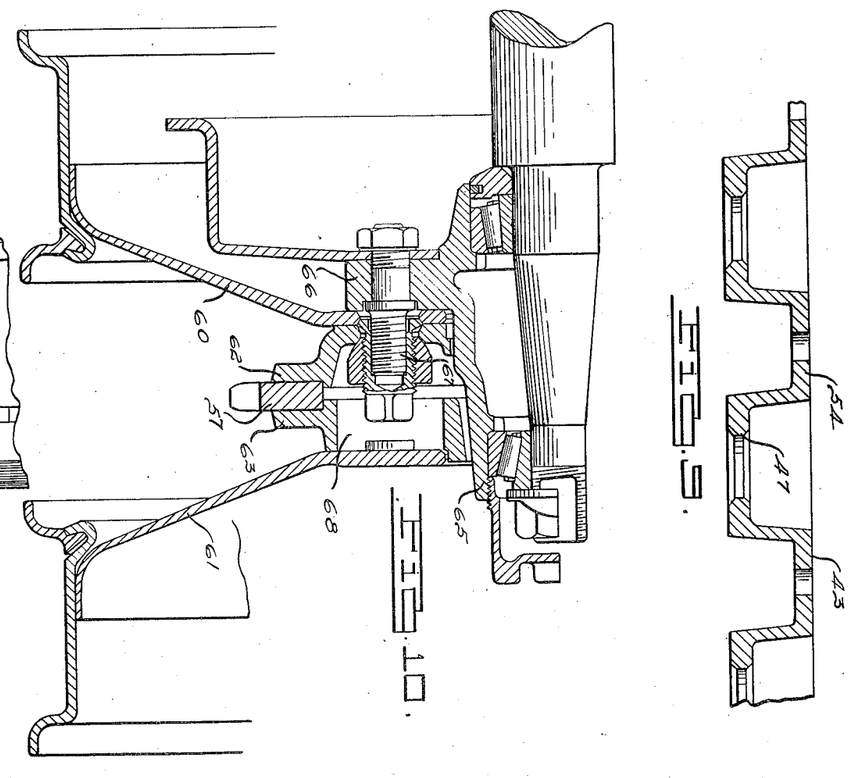
Figure 9 is a sectional view taken on the line 9—9 of Figure 8.
Figures 10 and 11 are sectional views similar to Figures 6 and 7 showing the sprocket as applied to a dual wheel combination.
Figure 11:
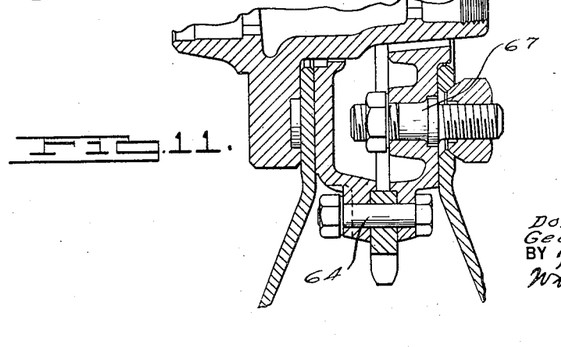

In the event the conditions under which the vehicle is operating renders it desirable to utilize both the dual wheel combination and the four-wheel drive attachment, we provide the construction shown in Figures 10 and 11. As will be observed from Figures 10 and 11, the sprocket wheels 57 are disposed between the inner and outer wheel body members 60 and 61 and are secured in position by annular members 62 and 63 having radial flanges embracing opposite sides of the sprocket wheels. The flanges and sprocket wheels are secured in assembled relation by means of the bolts and nuts 64 shown in Figure 11. Both the members 62 and 63 are centrally apertured for receiving the wheel hub 65 and the inner annular member 62 is secured to the radial fixed flange member 66 of the hub by the fastening means 67 identical to the fastening means 48 hereinbefore described and which ordinarily functions to secure the two-wheel body members 60 and 61 in juxtaposition. In the present instance, however, the outer wheel bodies 61 are clamped to the outer face of the annular member 63 by the fastening elements 68 which are arranged at the same pitch diameter as the fastening means 67, but are positioned intermediate the latter fastening means. In this connection it is to be noted that the outer annular member 63 is provided with apertures 68 therethrough opposite the fastening means 67 so that upon detaching the outer wheel body members 61, the attaching means 67 may be manipulated through the opening 68 from the outer side of the wheel. Thus, from the above it will be apparent that provision is also made for applying our improved four-wheel drive attachment to dual wheel constructions.

Aside from the demountable feature of my attachment as previously pointed out and aside from the fact that the attachment is composed of comparatively few parts and does not appreciably add to the weight of the vehicle when applied thereto, it is to be noted that the same materially reduces "tire fight", a serious objection in many tandem four-wheel drive vehicles. "Tire fight", as previously explained, is not only due to irregularities in the road over which the vehicle is traveling causing one wheel of the tandem wheel combination to travel a greater linear distance than the other wheel, but is also due to the slightly different rolling diameters of the tires caused by either irregular wear of the treads or variations in inflation pressures. Thus, it will be apparent that in the event a positive non-flexing driving connection is provided between the tandem wheels, one of the tandem wheels must necessarily slip in one direction while the other wheel slips in the opposite direction. This condition is serious especially when the vehicle is operating over hard, dry roads owing to the resistance offered to the relative slipping of the wheels which not only materially reduces the power output of the motor, but also effects undue wear of the tires and mechanical parts of the axles.

With our improved chain drive principle, previously described, "tire fight" is reduced to a minimum owing to the fact that the flexibility or backlash of the chains permits relative rotational movement of the tandem wheels and as a consequence, the inefficiencies usually caused by "tire fight" are eliminated. However, since it has been explained that "tire fight" is more serious on the hard, dry roads and since it is not essential to provide increased traction on roads of this latter character, the four-wheel drive attachment featured herein may be removed and thereby eliminate entirely any tendency of "tire fight".

Figure 4:
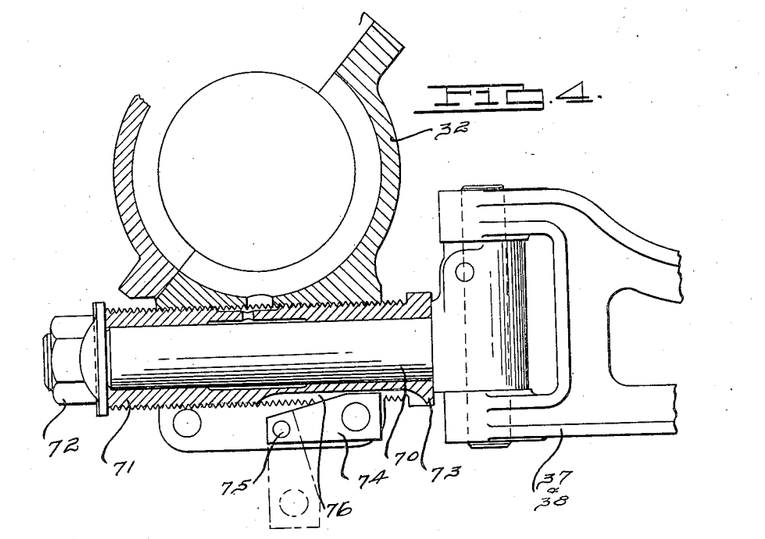
Figure 4 is a sectional view showing the adjusting means for the torque arms or radius rods.
Figure 5:
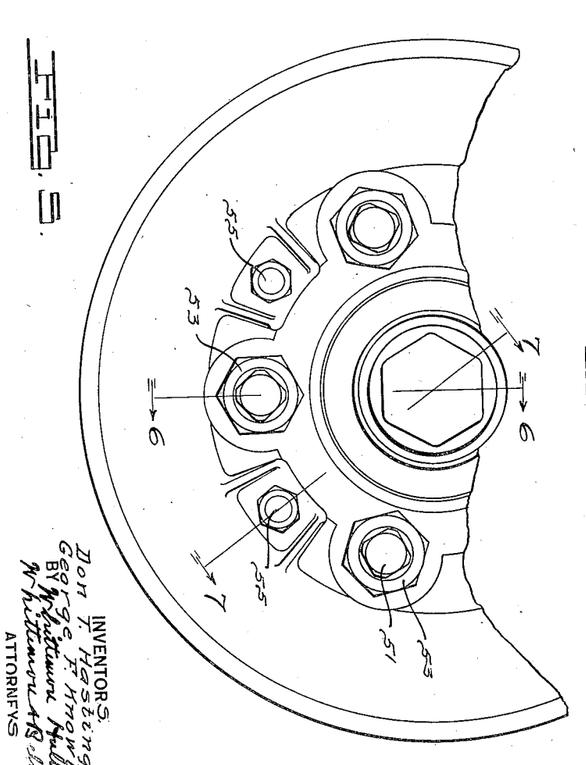
Figure 5 is a front elevational view of one of the rear wheels.

In order to compensate for variations in the length of the chains 41, means is provided for varying the distance between the drive and idler axle centers. The foregoing is accomplished by adjusting the length of the arms 37 and 38 in a manner suggested by Figure 4 of the drawings. As shown in this latter figure, the forward ends of the arms 37 and 38 are provided with spindles 70 journaled in suitable sleeves 71 which in turn are threaded in the lower portions of the brackets 32. The spindles are secured in place by means of suitable nuts 72 threadedly mounted upon the forward ends of the spindles and engaging the corresponding ends of the sleeves 71. The inner ends of the sleeves are provided with wrench-engaging portions 73 permitting rotation of the sleeves for moving the same axially within the brackets 32. Thus, from the foregoing it will be observed that the effective lengths of the arms 37 and 38 may be varied by merely loosening the nuts 72 and rotating the sleeves in the desired direction. Accidental rotation of the sleeves is prevented by means of a suitable latch 74 pivotally connected to the bracket 32 as at 75 and adapted to engage within a groove 76 extending axially of the sleeve 71.

Figure 12:
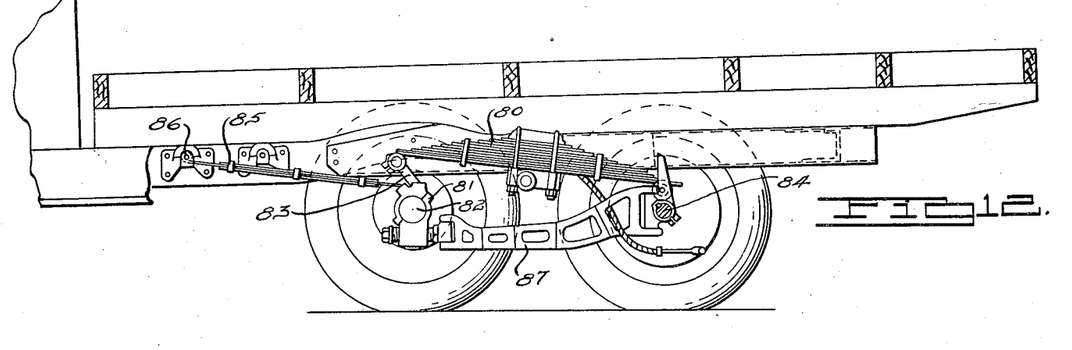

In certain types of vehicle constructions where the torque tube does not take the propulsional force of the driving wheels or in other words, is slidably connected at the forward end to the power unit, it becomes necessary to alter the above construction illustrated in Figure 1 slightly. One type of construction which has been found satisfactory for use in connection with vehicles of the above design is shown in Figures 12 and 13. The particular construction of vehicle illustrated in the aforesaid figures differs from the previously described arrangement in that the forward ends of the leaf springs 80 are connected to the brackets 81 on the drive shaft 82 by means of shackles 83 having their upper ends pivotally connected to the forward ends of the springs and the lower ends pivotally connected to the brackets. The driving axle 82 and interconnected dead axle 84 are so positioned that the shackles 83 normally lie at an angle approximating that illustrated in Figure 12. It will be apparent from Figure 12, that the toggle action of the spring load on the shackles tends to displace the dual axle combination toward the rear of the vehicle and in order to resist such action, a pair of radius rods 85 are provided. These rods are of the leaf spring type having the forward ends pivotally connected to the sills of the frame as at 86 and having the rear ends pivotally connected to the brackets 81 adjacent the pivotal connection of the shackles thereto, but above and in advance of the axis of the driving axle 82. In view of the fact that the rear ends of the radius rods are connected to the brackets 81 above and in advance of the axis of the driving axle and in view of the fact that the forward ends of the leaf springs tend to move the latter axle rearwardly placing the radius rods under tension, it will be noted that up and down movement of the driving axle will be limited to a predetermined irregular arc. The trailer axle 84 is connected to the driving axle 83 in predetermined spaced relation to the latter by the arms 87 so that while the driving axle passes through a defined arc, the trailer axle passes through an irregular circumscribed area.

What we claim as our invention is:

1. A vehicle having in combination, a pair of ground engaging wheels arranged in tandem, axles for the wheels, a brake assembly associated with each wheel, means for maintaining the wheels a fixed distance apart including, a bracket mounted upon one axle for oscillatory movement relative thereto, a second bracket on the other axle, an arm disposed between the axles and having the opposite ends pivotally connected to the brackets by pins having their axes extending transverse to the axes of the axles, and means for rigidly securing said second bracket to its associated axle whereby said arm performs the additional function of taking the torque reaction of the brake on the latter axle.

2. A vehicle having in combination, a frame, a pair of axles arranged one behind the other, means for suspending the axles from the frame including a spring pivotally connected intermediate the ends thereof to the frame at a point between the axles and having the ends thereof connected to said axles, the connection between one end of the spring and the adjacent axle comprising a bracket oscillatable about said axle, a shackle having one end pivoted to the end aforesaid of the spring and having the opposite end pivoted to said bracket, and means normally resisting movement of the shackle and bracket by the spring load and for controlling movement of the latter axle including a flexible radius rod normally under tension and having one end connected to the frame in advance of the said axle and the opposite end connected to the bracket.

3. A vehicle having in combination, a pair of axles arranged one behind the other, means interconnecting the axles to maintain the same a fixed distance apart, and means for controlling movement of one of said axles including a flexible radius rod normally under tension having one end connected to a fixed part of the frame and having the opposite end pivotally connected to said last-mentioned axle at a point offset from the axis of the latter in a direction to increase the radius of the arc of travel of this axle.

4. A vehicle having in combination, a pair of axles arranged one behind the other and connected together, a bracket mounted upon one of the axles, and means for controlling deflection of the latter axle including a flexible radius rod normally under tension having the forward end pivotally connected to a fixed part of the frame and having the rear end pivotally connected to said bracket at a point spaced above and forwardly with respect to the axis of the associated axle so as to increase the radius of the arc of travel of the latter axle.

5. A vehicle having in combination, a pair of axles arranged one behind the other and connected together, a bracket mounted upon one of the axles for rocking movement about the axis thereof, means for controlling movement of the latter axle including a flexible radius rod normally under tension having one end connected to a fixed part of the frame and having the opposite end pivotally connected to the bracket at a point offset from the axis of the associated axle in a direction to increase the radius of the arc of travel of this axle.

6. A vehicle having in combination, a pair of ground engaging wheels on opposite sides thereof and arranged one behind the other, axles for the wheels, means for maintaining the axles a fixed distance apart including a member located at one side of the medium line of the vehicle and interposed between the axles, a second member located upon the opposite side of the medium line of the vehicle and also interposed between said axles, brackets rockably mounted upon the axles at one side of the medium line of the vehicle and connected to opposite ends of one of said members, another bracket rockably mounted upon one of the axles on the opposite side of the medium line of the vehicle and connected to one end of the other of said members and still another bracket fixedly secured to the other of said axles and connected to the opposite end of said last named member.

7. A vehicle having in combination, a pair of ground engaging wheels arranged one behind the other, axles for the wheels, a bracket rotatably supported upon one of the axles, a second bracket mounted upon the other of said axles, an arm disposed between the axles having one end connected to one of the brackets for pivotal movement about an up and down axis, a member connected to the opposite end of the arm for pivotal movement relative thereto about an up and down axis and means for connecting said member to the other of said brackets permitting oscillation of the member about an axis extending transverse to both the axle and the pivotal connection of the arm with said member.

DON T. HASTINGS.
GEORGE F. KNOWLES.